(12) United States Patent
Stainer et al.

(10) Patent No.: US 10,926,801 B2
(45) Date of Patent: Feb. 23, 2021

(54) POWERTRAIN CATCHER APPARATUS

(71) Applicant: Ford Global Technologies, LLC, Dearborn, MI (US)

(72) Inventors: Duncan Stainer, Maldon (GB); Michael Spurling, Romford (GB); Burak Yazici, Istanbul (TR); Muhammet Balyemez, Istanbul (TR); Onur Dalli, Istanbul (TR); Gary Lansdowne, Benfleet (GB); Ian James, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/557,847

(22) Filed: Aug. 30, 2019

(65) Prior Publication Data

US 2020/0079431 A1 Mar. 12, 2020

(30) Foreign Application Priority Data

Sep. 12, 2018 (GB) .................................. 1814806.4

(51) Int. Cl.
*B62D 21/11* (2006.01)
*B62D 21/15* (2006.01)
*B62D 25/08* (2006.01)

(52) U.S. Cl.
CPC ............ *B62D 21/11* (2013.01); *B62D 21/155* (2013.01); *B62D 25/085* (2013.01)

(58) Field of Classification Search
CPC ..... B62D 21/15; B62D 21/155; B62D 25/085
See application file for complete search history.

(56) References Cited

U.S. PATENT DOCUMENTS

| 7,393,016 B2 | 7/2008 | Mitsui et al. |
| 9,045,172 B2 | 6/2015 | Gopal et al. |
| 9,610,980 B2* | 4/2017 | Nakauchi ............. B62D 25/082 |
| 9,776,663 B1 | 10/2017 | Craig et al. |
| 10,035,415 B1* | 7/2018 | Koch ................. F02M 37/0017 |
| 2006/0082036 A1* | 4/2006 | Miyahara .................. F16F 7/12 267/140.13 |

(Continued)

FOREIGN PATENT DOCUMENTS

| FR | 2990400 A1 | 11/2013 |
| JP | 2004114814 A | 4/2004 |

OTHER PUBLICATIONS

Great Britain Intellectual Property Office, Combined Search and Examination Report under Sections 17 and 18(3) Issues in Application No. GB1814806.4, dated Feb. 8, 2019, 5 pages.

*Primary Examiner* — James A Shriver, II
*Assistant Examiner* — James J Triggs
(74) *Attorney, Agent, or Firm* — Geoffrey Brumbaugh; McCoy Russell LLP

(57) ABSTRACT

A road vehicle having a powertrain is provided with a powertrain catcher apparatus comprised of a powertrain catcher and a transverse structural member having a weakened region against which the powertrain catcher reacts when the powertrain is moved rearwardly due to a collision. The powertrain catcher has a punch portion which punches through the weakened region to form an aperture with which the punch portion remains tightly engaged to restrain vertical and transverse movement of the powertrain.

20 Claims, 12 Drawing Sheets

(56) References Cited

U.S. PATENT DOCUMENTS

| | | | |
|---|---|---|---|
| 2006/0181071 A1* | 8/2006 | Mitsui | B62D 25/08 |
| | | | 280/784 |
| 2015/0028626 A1 | 1/2015 | Gopal et al. | |
| 2017/0101031 A1 | 4/2017 | Ohashi | |
| 2017/0282974 A1 | 10/2017 | Craig et al. | |

* cited by examiner

POWERTRAIN CATCHER APPARATUS

CROSS REFERENCE TO RELATED APPLICATIONS

The present application claims priority to United Kingdom Patent Application No. 1814806.4, filed on Sep. 12, 2018. The entire contents of the above-listed application are hereby incorporated by reference for all purposes.

FIELD

The present disclosure relates to a powertrain catcher apparatus to restrain movement of the powertrain during a vehicle impact.

BACKGROUND/SUMMARY

It is known to mount a powertrain for a vehicle at the front end of a vehicle in a compartment often referred to as an engine compartment. In the event that the vehicle is involved in a high speed frontal collision, the powertrain may release from its mountings and may be dislodged, allowing the powertrain to move in a direction parallel or opposite to a force of the collision. This may be undesirable as it can interfere with the operation of other equipment designed to reduce the effect of such a collision such as deformable front end members.

It is a further problem that such an unrestrained powertrain can move rearwardly and impact against a bulkhead separating the engine compartment from a passenger compartment. This is undesirable because it can result in intrusion of the bulkhead into the passenger compartment.

One issue associated with the provision of a strong and robust powertrain catcher apparatus is that there is significant motion of the powertrain on its mountings during normal use and so a fixed rigid restraining apparatus is not suitable for use. Thus, a balance between retaining the powertrain during a vehicle collision while still allowing some amount of movement outside of the vehicle collision is desired.

In one example, the issues described above may be addressed by a vehicle, comprising a powertrain, a bulkhead dividing a front compartment of the vehicle in which the powertrain is mounted from a passenger compartment of the vehicle and a powertrain catcher apparatus comprising a powertrain catcher, and a transverse structural member positioned rearwardly relative to the powertrain catcher, wherein the powertrain catcher is disposed between the powertrain and the transverse structural member and comprises a rigid arm portion extending away from a structural part of the powertrain and a punch portion extending rearwardly away from the rigid arm portion towards the transverse structural member, wherein the punch portion comprises an impact surface configured to impact and form an aperture in a region of the transverse structural member during some vehicle operating conditions, wherein the punch portion is tightly engaged with the aperture in the region. In this way, rearward movement of the powertrain in response to a vehicle collision may be limited.

As one example, the rigid arm punctures the region of the transverse structural member and fixedly engages with the aperture formed therein. The engagement may block the rigid arm from releasing, thereby blocking the powertrain from moving in directions perpendicularly to the rearward movement. Furthermore, the engagement may stop and/or slow a movement of the powertrain in the rearward direction to block the powertrain from colliding into the bulkhead.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-12 are shown to scale, however, other relative dimensions may be used if desired.

DETAILED DESCRIPTION

Figure 1:
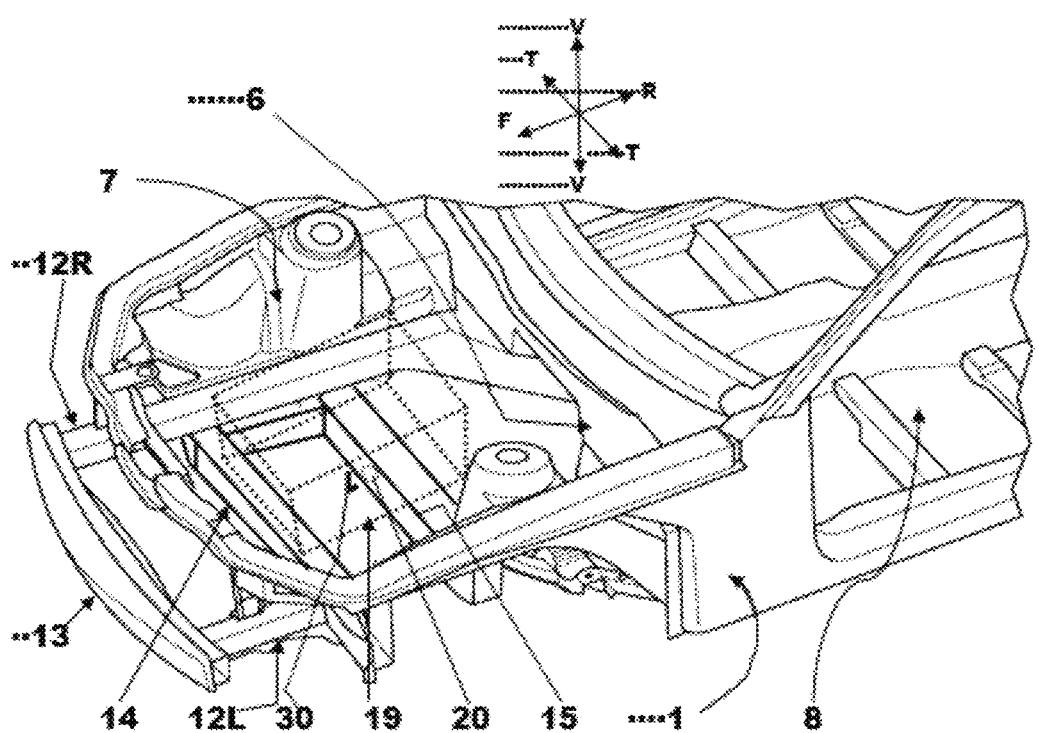
FIG. 1 shows a pictorial representation of a front end of a road vehicle showing a powertrain mounted in a front compartment of the vehicle.

The following description relates to systems and methods for a powertrain catcher. FIG. 1 shows a representation of a front end of a vehicle comprising a powertrain mounted in a front compartment of the vehicle. The powertrain may be arranged within a vicinity of a bulkhead, and during some conditions, such as during a front end vehicle collision, the powertrain may be forced toward the bulkhead.

Figure 2:
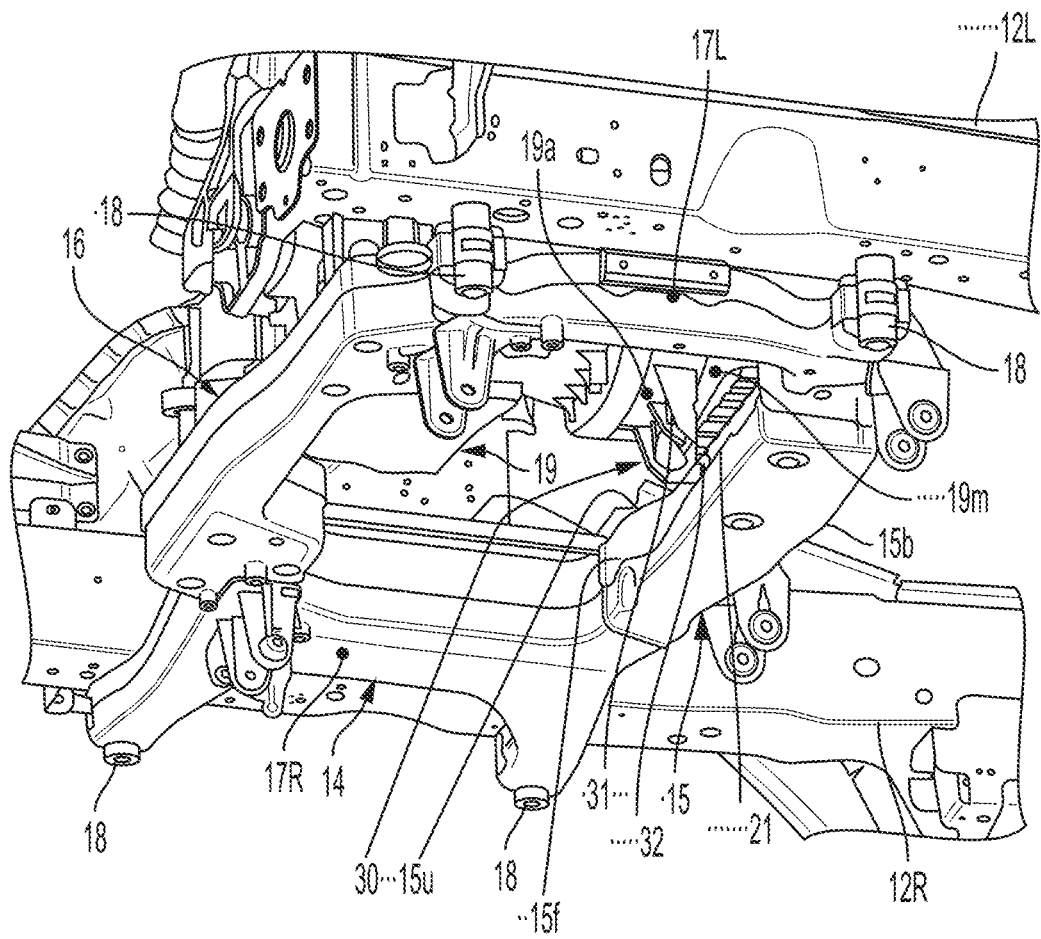
FIG. 2 shows a pictorial underside view of a part of a front end of the vehicle showing a first embodiment of a powertrain apparatus according to the disclosure.
Figure 3:
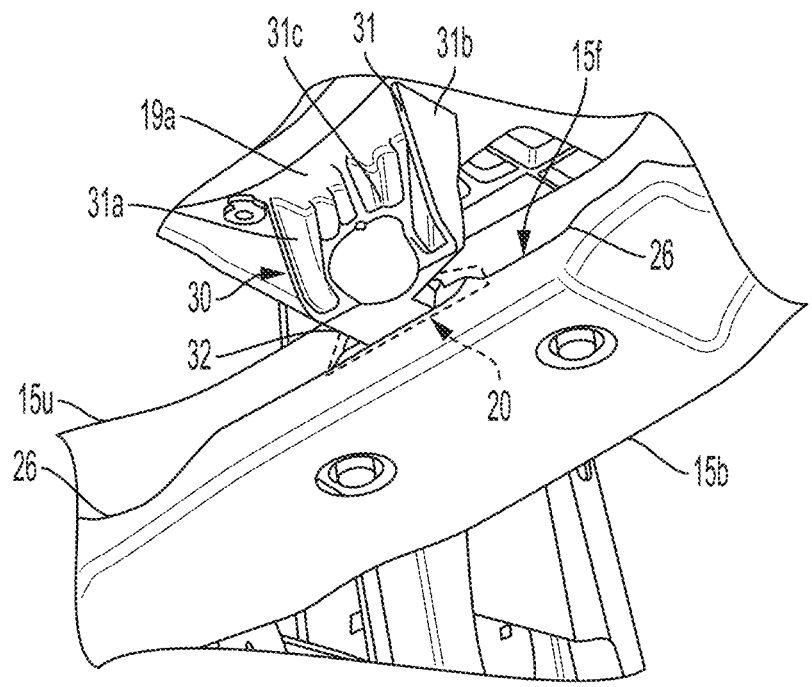
FIG. 3 shows an enlarged pictorial view from below of the powertrain catcher apparatus shown in FIG. 2.
Figure 4:
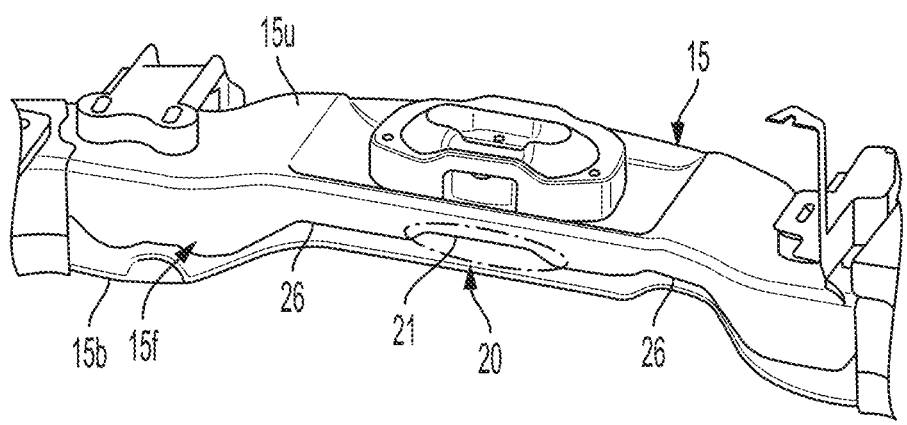
FIG. 4 shows a pictorial view from above of a transverse structural member forming part of the powertrain catcher apparatus shown in FIGS. 2 and 3.
Figure 5:
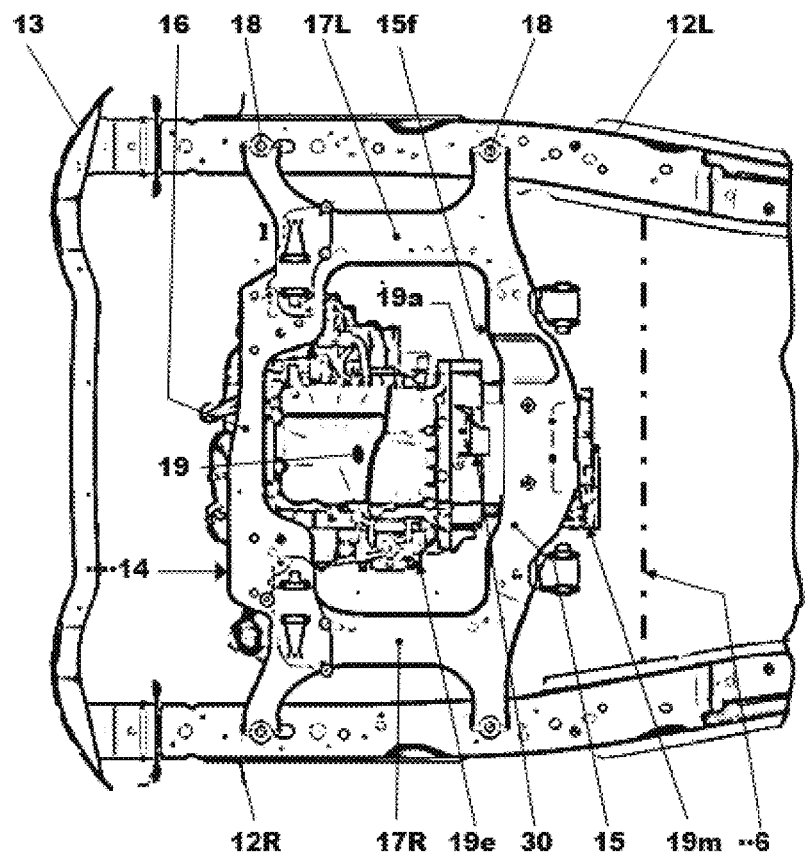
FIG. 5 shows an underside view of the front end of the vehicle showing the location of the powertrain catcher apparatus of FIGS. 2 to 4.
Figure 6A:
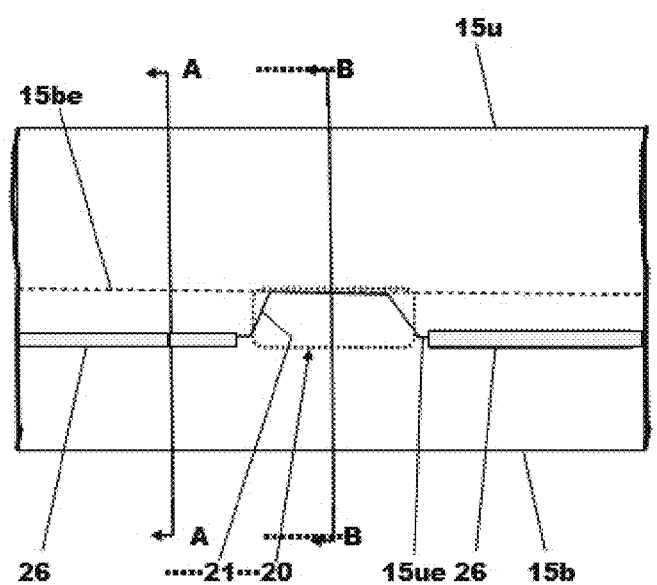
FIG. 6A shows a schematic side view of a central part of a transverse structural member such as the transverse structural member shown in FIGS. 2 to 4 showing its construction as a box section beam and a first arrangement for producing a weakened region.
Figure 6B:
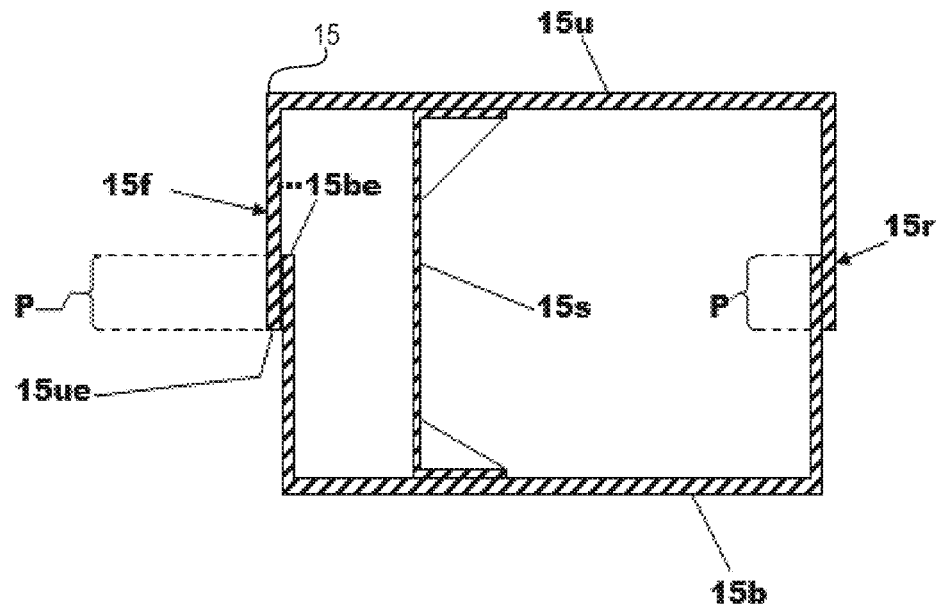
FIG. 6B shows a scrap cross-section along the line A-A shown in FIG. 6A.
Figure 6C:
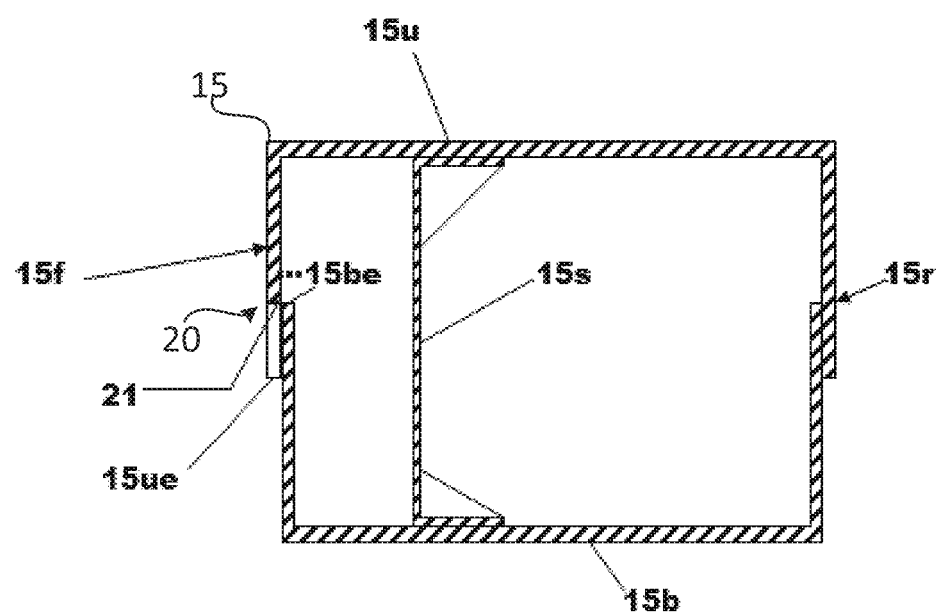
FIG. 6C shows a scrap cross-section along the line B-B shown in FIG. 6A.

FIG. 2 illustrates a pictorial underside view of a part of a front end of the vehicle showing a first embodiment of a powertrain catcher apparatus according to the disclosure. FIG. 3 shows an enlarged pictorial view from below of the powertrain catcher apparatus shown in FIG. 2. FIG. 4 shows a pictorial view from above of a transverse structural member forming part of the powertrain catcher apparatus shown in FIGS. 2 and 3. FIG. 5 shows an underside view of the front end of the vehicle showing the location of the powertrain catcher apparatus of FIGS. 2 to 4. FIG. 6A shows a schematic side view of a central part of a transverse structural member such as the transverse structural member shown in FIGS. 2 to 4 showing its construction as a box section beam and a first arrangement for producing a weakened region. FIG. 6B shows a scrap cross-section along the line A-A shown in FIG. 6A. FIG. 6C shows a scrap cross-section along the line B-B shown in FIG. 6A.

Figure 7:
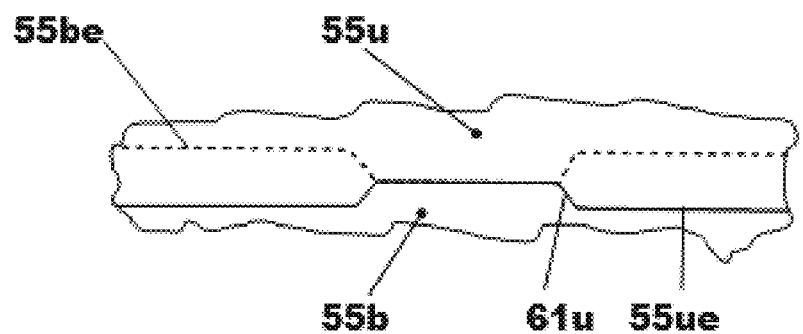
FIG. 7 shows a side view of an alternative constructional arrangement of a weakened region in a transverse structural member such as the box section beam shown in FIG. 6A.
Figure 8:
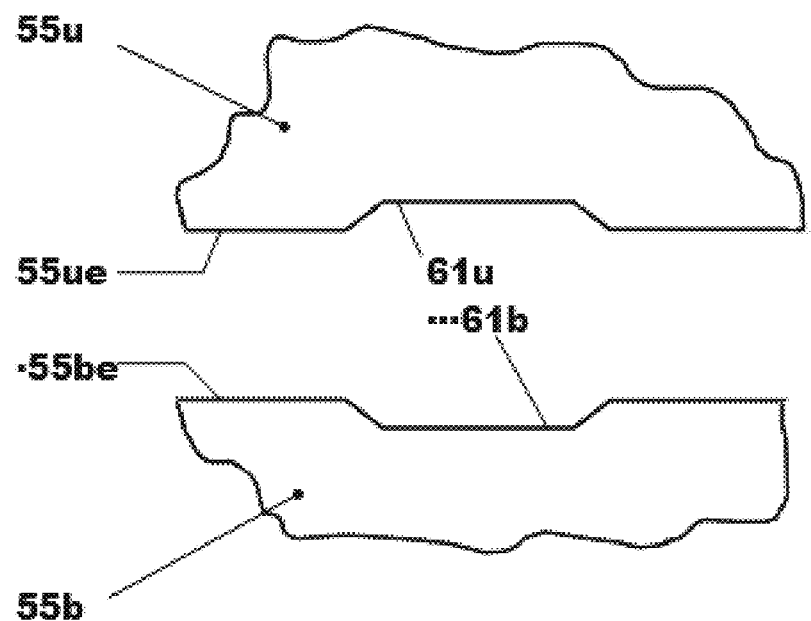
FIG. 8 shows a side view showing upper and lower members of the box section beam of FIG. 7 prior to assembly to form the box section beam showing two cut-away portions used to produce upon assembly the weakened region.
Figure 9A:
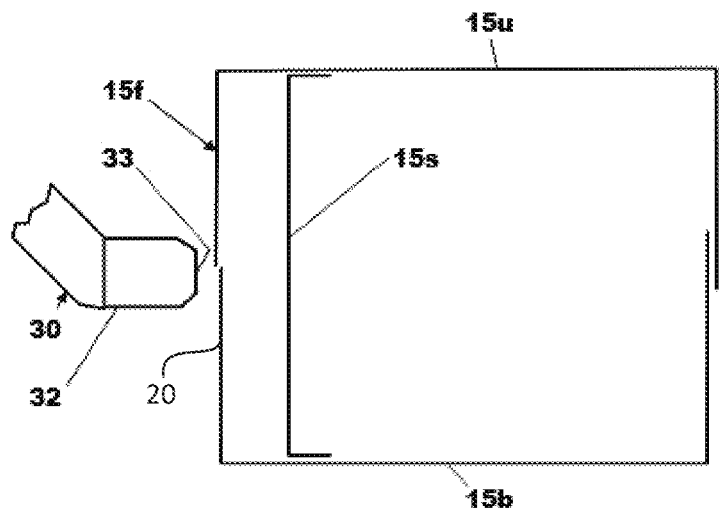
FIG. 9A shows a scrap cross-sectional view through a box section beam as shown in FIG. 6C showing a first embodiment of a powertrain catcher during normal use of a vehicle.
Figure 9B:
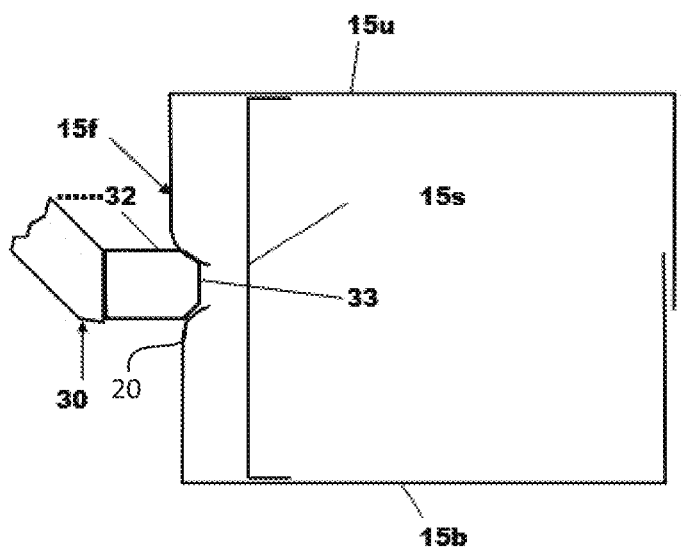
FIG. 9B shows a view similar to that of FIG. 9A but showing the powertrain catcher forming an opening in a front face of the box section beam due to rearward movement of a powertrain to which the powertrain catcher is connected.
Figure 9C:
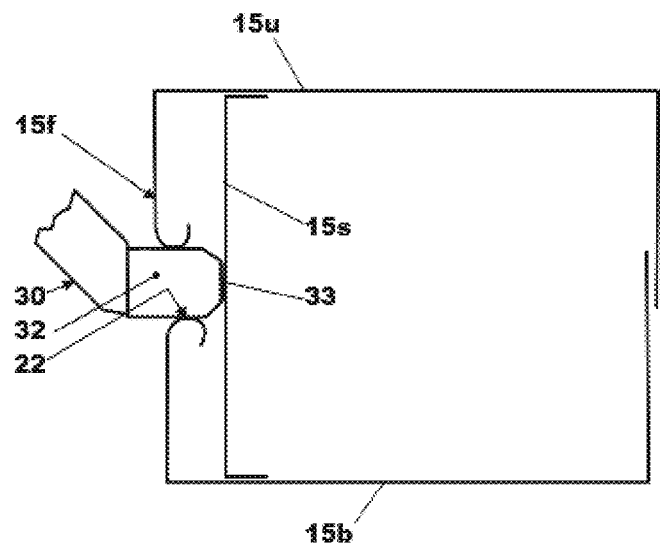
FIG. 9C shows a view similar to that of FIGS. 9A and 9B but showing the powertrain catcher engaged in an aperture that it has formed and in contact with a travel stop formed as part of the box section beam used to inhibit further rearward motion of the powertrain.

FIG. 7 shows a side view of an alternative constructional arrangement of a weakened region in a transverse structural member such as the box section beam shown in FIG. 6A. FIG. 8 shows a side view showing upper and lower members of the box section beam of FIG. 7 prior to assembly to form the box section beam showing two cutaway portions used to produce upon assembly the weakened region. FIG. 9A shows a scrap cross-sectional view through a box section beam as shown in FIG. 6C showing a first embodiment of a powertrain catcher during normal use of a vehicle. FIG. 9B shows a view similar to that of FIG. 9A but showing the powertrain catcher forming an opening in a front face of the box section beam due to rearward movement of a powertrain to which the powertrain catcher is connected. FIG. 9C shows a view similar to that of FIGS. 9A and 9B but showing the powertrain catcher engaged in an aperture that it has formed and in contact with a travel stop formed as part of the box section beam used to inhibit further rearward motion of the powertrain.

Figure 10A:
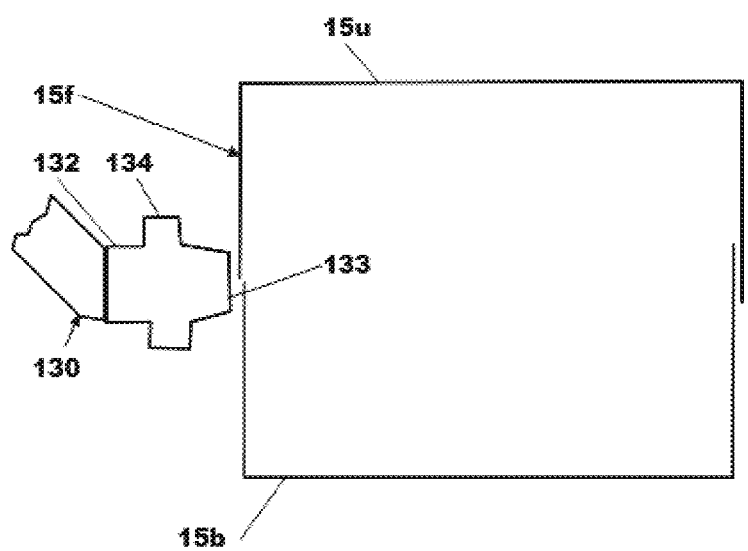
FIG. 10A shows a scrap cross-sectional view through a box section beam as shown in FIG. 6C showing a second embodiment of a powertrain catcher during normal use of a vehicle of which it forms a part.
Figure 10B:
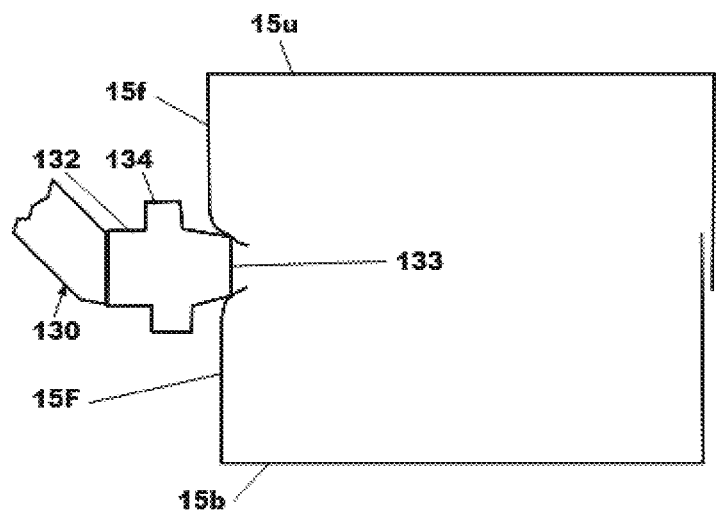
FIG. 10B shows a view similar to that of FIG. 10A but showing the powertrain catcher forming an opening in a front face of the box section beam due to rearward movement of a powertrain to which the powertrain catcher is connected.
Figure 10C:
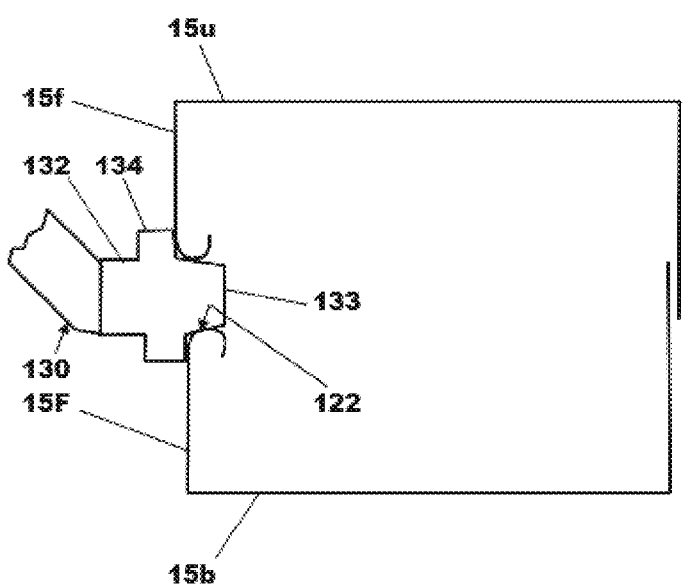
FIG. 10C shows a view similar to that of FIGS. 10A and 10B but showing a travel stop formed as part of the powertrain catcher engaging the box section beam to inhibit further rearward motion of the powertrain.

FIG. 10A shows a scrap cross-sectional view through a box section beam as shown in FIG. 6C showing a second embodiment of a powertrain catcher during normal use of a vehicle of which it forms a part. FIG. 10B shows a view similar to that of FIG. 10A but showing the powertrain catcher forming an opening in a front face of the box section beam due to rearward movement of a powertrain to which the powertrain catcher is connected. FIG. 10C shows a view similar to that of FIGS. 10A and 10B but showing a travel stop formed as part of the powertrain catcher engaging the box section beam to inhibit further rearward motion of the powertrain.

Figure 11A:
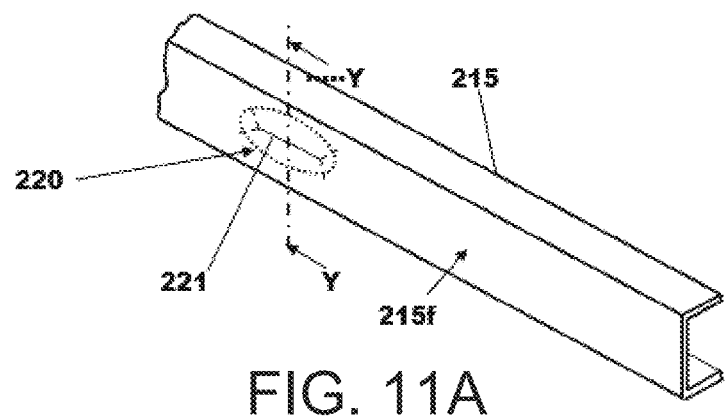
FIG. 11A shows a pictorial view of a transverse structural member formed as a single part having an alternative arrangement for producing a weakened region.
Figure 11B:
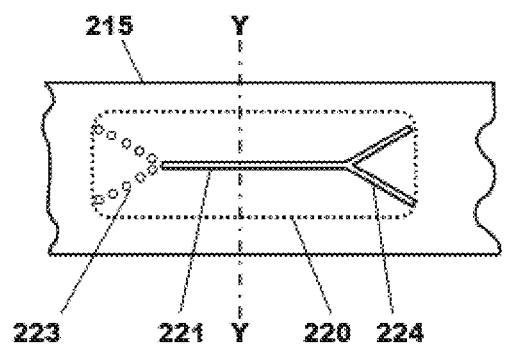
FIG. 11B shows an enlarged view of the weakened region shown in FIG. 11A showing three alternative weakening arrangements.
Figure 11C:
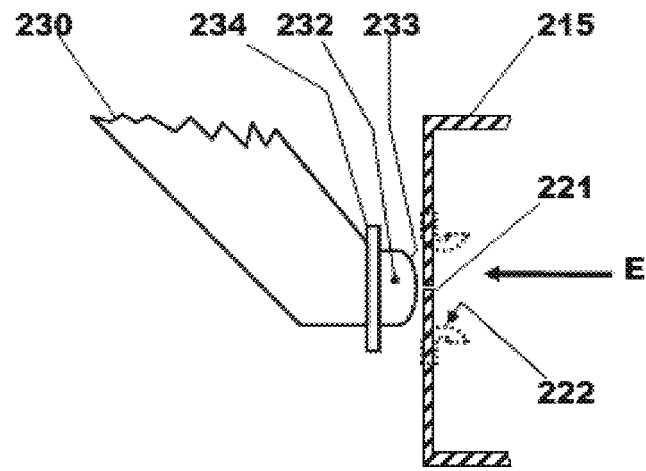
FIG. 11C shows a cross-section view on the line Y-Y on FIGS. 11A and 11B showing a powertrain catcher approaching the transverse structural member.
Figure 12:
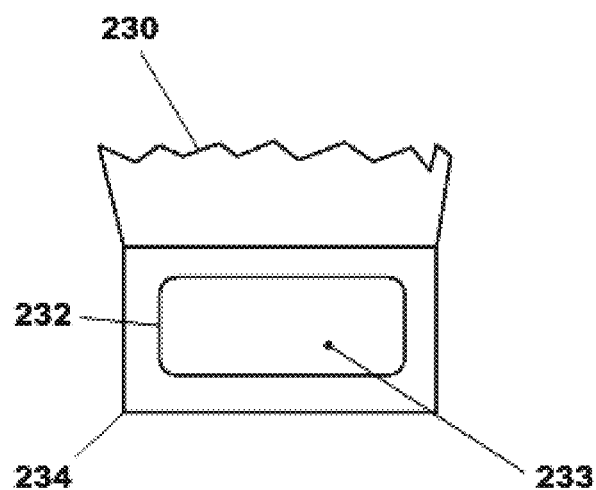
FIG. 12 shows a view in the direction of the arrow E on FIG. 11B showing on an enlarged scale an end portion of the powertrain catcher.

FIG. 11A shows a pictorial view of a transverse structural member formed as a single part having an alternative arrangement for producing a weakened region. FIG. 11B shows an enlarged view of the weakened region shown in FIG. 11A showing three alternative weakening arrangements. FIG. 11C shows a cross-section view on the line Y-Y on FIGS. 11A and 11B showing a powertrain catcher approaching the transverse structural member. FIG. 12 shows a view in the direction of the arrow E on FIG. 11B showing on an enlarged scale an end portion of the powertrain catcher.

In one example, a vehicle comprises a powertrain catcher apparatus that in the event of a frontal impact can effectively restrain movement of a powertrain while permitting motion of the powertrain on its mountings during normal use. Herein, normal use is defined as use of the powertrain outside of a vehicle collision and/or a vehicle impact.

According to a first aspect of the disclosure there is provided a vehicle having a powertrain, a bulkhead dividing a front compartment of the vehicle in which the powertrain is mounted from a passenger compartment of the vehicle and a powertrain catcher apparatus comprising a powertrain catcher and a transverse structural member forming part of the vehicle positioned rearwardly with respect to the powertrain catcher wherein the powertrain catcher is disposed between the powertrain and the transverse structural member and comprises a rigid arm portion extending away from a structural part of the powertrain and a punch member portion extending rearwardly away from the arm portion towards the transverse structural member, the punch portion having an impact surface that, during normal use, is spaced away from a weakened region of transverse structural member and that, in the event of rearward displacement of the powertrain, impacts against the weakened region of the transverse structural member thereby causing the punch portion to push through the weakened region of the transverse structural member to form an aperture with which the punch portion is tightly engaged. Herein, rearwardly describes a direction that is opposite to a forward direction of travel of the vehicle. Furthermore, the weakened region may be differentiated from other regions of the transverse structural member in that a durability of the weakened region may be less than other regions of the transverse structural member. For example, the weakened region may be less thick, comprise one or more cutouts, a combination thereof, or other features that enable the weakened region to degrade in response to contact from the rigid arm portion of the powertrain catcher. As will be described herein, the deliberate degradation of the weakened region may allow the arm portion of the powertrain catcher to fixedly interact with the weakened region and an aperture formed therein due to the degradation to the weakened region, wherein the fixed interaction may block the powertrain from further advancing in the rearward direction.

The transverse structural member may be located on the vehicle between the powertrain catcher and the bulkhead dividing the front compartment from the passenger compartment (e.g., an interior cabin).

The vehicle may have left and right hand side rails extending forwardly from the bulkhead and the transverse structural member may be fastened at one end to the left side rail and is fastened at an opposite end to the right side rail. Said another way, a first side rail may extend along a first longitudinal side of the vehicle and a second side rail may extend along a second longitudinal side of the vehicle, wherein the transverse structural member is physically coupled to each of the first and second side rails at opposite extreme ends. In one example, the first side rail is identical to the left side rail and the second side rail is identical to the right side rail.

The transverse structural member may be a rear cross member of a sub-frame used to support the powertrain in the front compartment.

The sub-frame may also have a left hand side member, a right hand side member and a front cross member, wherein the rear cross member may be fastened to the left and right side rails via the left side and right side members respectively. In one example, the left hand side member and the right hand side member are a first side member and a second side member, respectively.

The powertrain catcher may be formed as an integral part of the structural part of the powertrain.

Alternatively, the powertrain catcher may be a separate component that is fastened to the structural part of the powertrain.

The powertrain catcher apparatus may further comprise a travel stop to limit rearward movement of the powertrain after engagement of the punch member with the aperture.

The travel stop may be formed as part of the powertrain catcher. Alternatively, the travel stop may be formed as part of the transverse structural member.

The transverse structural member may be a box section beam formed of upper and lower members having overlapping edge portions that are secured together to form the box section beam. In which case, at least one edge of the upper and lower members forming in combination a front face of the box section beam may be recessed to form a cutaway forming the weakened region.

There may be only one thickness of material forming the front face of the box section beam in the weakened region.

In order to further weaken the transverse structural member in the weakened region, the upper and lower members forming the front face of the box section beam may not be secured together in the weakened region of the transverse structural member. As described above, weakening the transverse structural member comprises decreasing a thickness and/or introducing one or more cutouts to the transverse structural member such that the travel stop of the powertrain catcher may puncture the weakened region and form an aperture therein, wherein the travel stop interacts with the aperture in a way that blocks further movement of the powertrain in the event a vehicle collision, such as a front vehicle collision.

With reference to FIG. 1, there is shown a front end of a road vehicle 1 provided for reference purposes. The vehicle 1 has a pair of side rails 12L, 12R extending forwardly from a bulkhead 6 to support at a front end of the vehicle 1 a bumper beam 13. In one example, the front end of the vehicle is a leading edge of the vehicle when the vehicle is being propelled in a drive gear, wherein the drive gear does not include a reverse gear.

In one example, the first side rail 12L is arranged along a first longitudinal side of the vehicle 1 and the second side rail 12R is arranged along a second longitudinal side of the vehicle 1. The first longitudinal side and the second longitudinal side are opposite one another and parallel to a forward and a rearward direction of travel of the vehicle 1.

A powertrain 19 is shown in dotted outline supported by a sub-frame 14 in a front compartment 7 of the vehicle 1. The sub-frame 14 is fastened to the two side rails 12L, 12R so as to provide a strong support for the powertrain 19.

The powertrain 19 is connected to the sub-frame 14 by a number of flexible mounts (not shown) so as to reduce the transmission of vibration from the powertrain 19 to other parts of the vehicle 1 such as a passenger compartment 8.

The passenger compartment 8 is separated from the front compartment 7 by a bulkhead 6 in a manner as is well known to one or ordinary skill in the art.

A powertrain catcher 30 is shown schematically depending from the powertrain 19 so as to be spaced away from a transverse structural member 15 of the sub-frame 14. The transverse structural member 15 includes a weakened region 20 with which the powertrain catcher 30 engages in the event that the powertrain 19 is moved rearwardly in the event of a collision.

FIG. 1 illustrates reference directions with the double arrow T-T indicating a transverse axis of the vehicle 1, the double arrow V-V indicating a vertical axis of the vehicle 1 and the double arrow F-R indicating a longitudinal axis of the vehicle 1 with "F" indicating the front and "R" indicating the rear. These references are used throughout to indicate the orientation of objects and so an object said to be 'extending transversely' or said to be "transverse" will be arranged to extend substantially in the direction of the transverse axis T-T.

It will be appreciated that the term "passenger compartment" may be defined as a compartment in which one or more occupants can be accommodated.

With reference to FIGS. 2 through 9C there is shown in more detail a first embodiment of a powertrain catcher apparatus for inhibiting movement of the powertrain 19 forming part of the road vehicle 1 in the event of a collision, such as a frontal collision. The figures may be described in tandem herein. Components previous introduced in FIG. 1 may be similarly number in subsequent figures.

The powertrain catcher apparatus forms part of a road vehicle such as the road vehicle 1 shown in FIG. 1.

As before the vehicle includes a bulkhead 6 (shown as a dotted line in FIG. 5) dividing the front compartment 7 of the vehicle 1 in which the powertrain 19 is mounted from the passenger compartment 8 of the vehicle 1.

As shown in FIGS. 2, 3, and 5, the powertrain catcher apparatus comprises the powertrain catcher 30 and the transverse structural member 15 positioned rearwardly with respect to the powertrain catcher 30.

The powertrain catcher 30 is disposed between the powertrain 19 and the transverse structural member 15 and, in the case of the embodiment illustrated in FIGS. 2 and 3, comprises a rigid arm portion 31 extending away from a structural part 19A of the powertrain 19 and a punch member portion 32 extending in a rearward direction of the vehicle 1 away from the arm portion 31 towards the transverse structural member 15.

The powertrain catcher 30 is formed as an integral part of the structural part 19a of the powertrain 19 (see FIG. 3). The structural part in the case of this example is a cast metal adaptor ring 19a joining an engine 19e to an electric machine 19m. In one example, the vehicle 1 of FIG. 1 may be a hybrid vehicle.

It will however be appreciated that in other embodiments the structural part can be a more durable portion of a powertrain such as, for example a cylinder block of an engine, a transmission casing, or a housing of an electric machine.

The powertrain catcher 30 is formed as an integral part of the structural part of the powertrain 19 by being cast as one with the adaptor ring 19a. It will however be appreciated that in other embodiments the powertrain catcher can be a separate component that is fastened to the structural part of the powertrain by for example threaded fasteners.

As shown in FIG. 3, the rigid arm portion 31 is comprised of two flanges 31a, 31b and a central web 31c and is substantially L-shaped with the rigid arm portion 31 extending downwardly from the adaptor ring 19a and the punch portion 32 extending rearwardly from a lower end of the rigid arm portion 31, in one embodiment. Said another way, the rigid arm portion 31 comprises a first flange 31a and a second flange 31b arranged opposite one another at extreme ends of the rigid arm portion 31. The first flange 31a and the second flange 31b may comprise angled cuts such that a cross-section taken along a longitudinal direction comprises a triangular shape, in one example.

In one embodiment, the central web 31c comprise a plurality of columns extending in a direction parallel to the first and second flanges 31a, 31b. Each of the plurality of columns is arranged between and spaced away from the first and second flanges 31a, 31b.

The punch portion 32 has an impact surface 33 (not visible in FIGS. 2 to 5, but visible in FIGS. 9A, 9B, and 9C) at a free end thereof that, during normal use, is spaced away from the weakened region 20 of the transverse structural member 15 (illustrated via a dotted outline). In one example, the weakened region 20 may be less durable than more durable portions of the powertrain. In one embodiment, the weakened region 20 is configured to degrade in response to a threshold force from the punch portion 32 in a direction. In one example, the weakened region 20 degrade (e.g., cracks) in response to an impact in a rearward direction due to a frontal collision.

In one example, the powertrain catcher 30 comprising the rigid arm portion 31 and the punch portion 32 comprises an L-shape. In one example, the powertrain catcher 30 is asymmetric, with the punch portion 32 biased toward one of the first or second flanges 31a, 31b. The punch portion 32 extends from the rigid arm portion 31 in the rearward direction portion the transverse structural member 15. In one example, the rigid arm portion 31 extends primarily in an axial direction and the punch portion 32 extends perpendicular to the rigid arm portion in the longitudinal direction.

In the case of the example of FIG. 2, the transverse structural member is in the form of a rear cross member 15 of the sub-frame 14 used to support the powertrain 19 in the front compartment 7.

The sub-frame 14 has in addition to the rear cross member 15, a left hand side member 17L, a right hand side member 17R and a front cross member 16. The rear cross member 15 is fastened to the left and right side rails 12L and 12R via the left hand and right side members 17L and 17R respectively by means of threaded fasteners 18. Said another way, the sub-frame 14 comprises a first side member 17L and a second side member 17R, opposite the first side member 17L, wherein each of the first and second side members extend along the longitudinal axis parallel to the forward and rearward directions. The first and second side members are physically coupled to the first and second side rails 12L and 12R.

The rear cross member 15 forming the transverse structural member is in the case of this example formed by a box section beam formed of C-shaped upper and lower members 15u and 15b that are secured together by a continuous welding process which produces welded joints 26 (see FIG. 3). In other examples the upper and lower members 15u and 15b can be secured together by some other method such as, for example, spot welding or riveting.

As shown in FIG. 6A, the upper and lower members 15u and 15b have free edges 15ue and 15be that may overlap one another along a front face 15f and a rear face 15r of the rear cross member beam 15 to form an overlap region "P" (see FIG. 6B) extending along the front and rear faces 15f and 15r of the rear cross member 15. In the case of this example the upper member 15u overlies the lower member 15b to form the overlap regions "P". Thus, the embodiment illustrated in FIG. 6B illustrates an example of a cross-member without a weakened region, in one example.

Turning now to FIG. 6C, it shows one embodiment of an example of the cross member beam 15, which is differentiated from the cross member beam of the previous examples, such as the example illustrated in FIG. 6B, to enhance the effects of the powertrain catcher 30. The edge 15ue of the upper member 15u forming part of the front face 15f of the rear cross member 15 has a recess 21 in the edge 15ue of the upper member 15u. The recess 21 forms the weakened region 20 of the box section beam 15 by producing a cutaway area on the front face 15f of the rear cross member 15 in which there is only one thickness of material forming the front face 15f of the rear cross member 15. In one example, the recess 21 is illustrated via a white filled box, which corresponds to cut-out portion of the edge 15ue, thereby removing the overlap region "P" of the previous example. In the case of this example, the one thickness of material is the material forming the overlapping portion of the lower member 15b of the rear cross member 15. However, it will be appreciated that if, as an alternative, a cutaway area is formed in the lower member 15b then the one thickness of material forming the front face 15f of the rear cross member 15 would be the upper member 15u. That is to say, the thickness may not include a combination of the thicknesses of the upper edge 15ue and the lower edge 15be, but, in one example, the thickness at the weakened region 20 corresponds to a thickness of the rear cross-member 15.

The provision and/or the benefit of a single material thickness (e.g., incorporation of the recess 21 to stop overlap of the edges) enables the punch portion 32 of the powertrain catcher 30 to more easily punch through the rear cross member 15 as will be described in more detail hereinafter. To further weaken the rear cross member 15, the upper and lower members 15u and 15b forming the front face 15f are not secured together in the region of the weakened region 20. Any securing elements such as seam welding or spot welding extends up to or is located close to the weakened region 20 in order to prevent undesirable distortion outside of the weakened region 20 which could reduce the stabilizing effect of the engagement of the punch portion 32 with the aperture 20.

The rear cross member 15 is located between the powertrain catcher 30 and the bulkhead 6 dividing the front compartment 7 from the passenger compartment 8 so that in the case of rearward movement of the powertrain 19, the powertrain catcher 30 will contact the rear cross member 15. More specifically, the impact surface 33 of the punch portion 32 will, in the event of rearward displacement of the powertrain 19, impact against the weakened region 20 on a front face 15f of the rear cross member 15 causing the punch portion 32 to punch through the weakened region 20 of the rear cross member 15 to form an aperture 22 (see FIG. 9C)

in the rear cross member 15. The punch portion 32 thereafter remains tightly engaged with the aperture 22 thereby restraining both vertical movement of the powertrain 19 and transverse movement of the powertrain 19.

It will be appreciated that the punch portion 32 has a complementary shape to the aperture 22 formed by it.

As shown in FIGS. 6B and 6C and FIGS. 9A, 9B, and 9C, the rear cross member 15 includes a travel stop 15s to limit rearward movement of the powertrain 19 after engagement of the punch member 32 with the aperture 22. The travel stop in the case of this example is formed by a C-shaped member 15s fastened inside the rear cross member 15 however it will be appreciated that the travel stop could be formed in some other manner by for example, shaping one of the upper and lower member 15u and 15b to form the travel stop. Additionally or alternatively, the travel stop 15s may comprise a bracket shape in one example.

As described hereinafter with reference to FIGS. 9A to 9C, the travel stop 15s is engaged by impact surface 33 of the punch portion 32 of the powertrain catcher 30 to restrain further movement of the powertrain 19 in a rearward direction by transferring force from the powertrain 19, through the powertrain catcher 30, to the travel stop 15s, and to the rear cross member 15, which is deflected in a controlled manner thereby absorbing energy. This deformation of the rear cross member 15 may reduce rearward movement of the powertrain 19 compared to an unrestrained condition so that contact of the powertrain 19 with the bulkhead 6 is either significantly reduced or blocked depending upon the magnitude of the force transferred from the powertrain 19 and the distance of the un-deformed rear cross member 15 from the bulkhead 6. As described above, in one example, the interaction between the impact surface 33 of the powertrain catcher 30 with the travel stop 15s of the cross member 15 may occur during a vehicle collision, such as a front vehicle collision that generates a threshold amount of force to move the powertrain 19 in the rearward direction. In one example, the threshold amount of force is equal to an amount of force greater than a force generated during normal driving (e.g., driving conditions outside of a vehicle collision).

In FIGS. 7 and 8, there is shown an alternative arrangement, relative to the arrangement of FIG. 6C, for producing a weakened region that use two rather than one cutaway area to produce the weakened region in the rear cross member 15.

In FIG. 8, upper and lower members 55u and 55b forming the rear cross member 15 are shown in the region of a weakened region 60 prior to assembly.

In the case of this example, an edge 55ue of the upper member 55u forming part of a front face of the rear cross member 15 is cutaway to form a recess 61u in the edge 55ue of the upper member 55u and an edge 55be of the lower member 55b forming the other part of a front face of the rear cross member 15 is cutaway to form a recess 61b in the edge 55be of the lower member 55b.

When the upper and lower members 55u and 55b are assembled together, the two cutaways formed by the recesses 61u, 61b define the weakened region 60 of the rear cross member 15 by producing an area on the front face of the rear cross member 15 in which there is only one thickness of material forming the front face.

With reference to FIGS. 9A, 9B, and 9C there is shown diagrammatically how the powertrain catcher apparatus operates. In one example, the FIGS. 9A-9C illustrate the powertrain catcher apparatus decreasing movement of the powertrain in the rearward direction toward a region of the bulkhead.

In FIG. 9A, the punch portion 32 of the powertrain catcher 30 is shown in a normal use position prior to a frontal collision of the vehicle 1. In this normal position the impact surface 33 of the punch portion 32 is spaced away from the front face 15f of the rear cross member 15. The powertrain 19 is therefore free to move on its mountings and there is no contact between the powertrain 19 or the powertrain catcher 30 and the rear cross member 15. In one example, the powertrain catcher 30 remains spaced away from the front face 15f throughout any oscillations of the powertrain 19 during normal vehicle operation as forces generated during normal vehicle operation may be too low to force the powertrain 19, and therefore the powertrain catcher 30, far enough in the rearward direction to contact the front face 15f. As such, this gap may block inadvertent contact between the impact surface 33 and the front face 15f.

In FIG. 9B, the powertrain 19 has been moved rearwardly in response to a force generated during a frontal collision and the punch portion 32 has impacted against the front face 15f of the rear cross member 15 causing the impact face 33 to punch through the weakened region 20 of the rear cross member 15. This has caused material near the edges of the upper and lower member 15u and 15b respectively to be plastically deformed producing an opening in the front face 15f of the rear cross member 15. In one example, the impact surface 33 collides with the weakened portion of the front face 15f, wherein the impact surface 33 forces the edges of the upper and lower members 15u, 15b forming the front face 15f to deform and bend in a rearward direction.

In FIG. 9C, the rearward movement of the powertrain 19 has continued causing the impact face 33 of the punch portion 32 to impact against the travel stop 15s. In this fully engaged position of the punch portion 32 an aperture 22 has been formed by the punch portion 32 corresponding to the dimensions of the punch portion 32. The punch portion 32 thereafter remains tightly engaged with the aperture 22 that it has produced to prevent vertical or transverse movement of the powertrain 19. In addition, the contact of the impact face 33 of the punch member 32 with the travel stop 15s produces a force path from the powertrain 19 to the rear cross member 15 and any further rearward movement of the powertrain 19 will be resisted by the rear cross member 15 which, if the force applied thereto is high enough, will deform in a predefined manner to absorb energy while reducing rearward movement of the powertrain 19.

Thus, in one example, the aperture 22 formed in the weakened region 20 blocks the punch portion 32 from moving in a direction other than the rearward direction. If the punch portion 32 continues to travel in the rearward direction, then the punch portion 32 may contact the travel stop 15s, which may block and/or mitigate displacement of the punch portion 32 further in the rearward direction. In this way, the combination of the features of the powertrain catcher 30, including the punch portion 32, and the rear cross member comprising the weakened portion 20 and the travel stop 15s may limit displacement of the powertrain 19 in the rearward direction in the event of a front vehicle collision.

With particular reference to FIGS. 10A, 10B, and 10C, there is shown diagrammatically how an alternative embodiment of a powertrain catcher apparatus operates. The progression of the powertrain catcher through FIGS. 10A to 10C is similar to FIGS. 9A-9C. However, the powertrain catcher 130 differs from the powertrain catcher 30 of FIGS. 9A to 9C in that a travel stop 134 is formed as part of a powertrain catcher 130 rather than being a part of the rear cross member 15.

In FIG. 10A, a punch portion 132 of a powertrain catcher 130 is shown in a normal use position prior to a vehicular collision. In this normal position an impact surface 133 on the end of the punch portion 132 is spaced away from the front face 15f of the rear cross member 15. The powertrain 19 is therefore free to move on its mountings and there is no contact between the powertrain 19 or the powertrain catcher and the rear cross member 15.

In FIG. 10B, the powertrain 19 has been moved rearwardly and the punch portion 132 has impacted against the front face 15f of the rear cross member 15 causing the impact face 133 to be pushed through a weakened region of the rear cross member 15. This has caused material near the edges of the upper and lower member 15u and 15b respectively to be deformed and an opening is formed in the front face 15f of the rear cross member 15.

In FIG. 10C, the rearward movement of the powertrain 19 has continued causing the impact face 133 of the punch portion 132 to fully enter the rear cross member 15 and the travel stop 134 to impact against the front face 15f of the rear cross member 15. In this fully engaged position, an aperture 122 has been formed by the punch portion 132 corresponding to the dimensions of the punch portion 132. The punch portion 132 will then remain tightly engaged with the aperture 122 that it has produced so as to prevent vertical or transverse movement of the connected powertrain 19. This is because the powertrain 19 is likely to be still moving in a rearward direction thereby preventing disengagement of the punch portion 132.

The contact of the travel stop 134 with the powertrain catcher 130 and the front face 15f produces a force path from the powertrain 19 to the rear cross member 15 and any further rearward movement of the powertrain 19 is resisted by the rear cross member 15 which, if the force applied thereto is high enough, will deform in a predefined manner to absorb energy and reduce rearward movement of the powertrain 19.

Thus, in the example of FIGS. 10A, 10B, and 10C, the travel stop 15s may be omitted from the rear cross member 15 and may be integrally formed with the punch portion 132. The travel stop 134 may be a single continuous piece extending around a circumference of the punch portion 132, wherein the travel stop 134 increases a diameter of the punch portion 132 such that the aperture 122 formed by the punch portion 132 in the weakened region comprises a diameter smaller than a diameter of the travel stop 134. In this way, a rearward facing side of the travel stop 134 may press against a forward facing side of the front face 15f as the powertrain catcher 130 moves in the rearward direction. Additionally or alternatively, the travel stop 134 may be a plurality of extensions arranged along a single circumference of the punch portion 132. It will be appreciated that additional travel stops may be arranged on the punch portion 132 to further promote the mitigation of the displacement of the powertrain 19 in the rearward direction.

It will be appreciated that the deformation of the material forming the rear cross member 15 due to rolling and folding as the punch portion 32, 132 pushes through the weakened region will work harden the material so deformed and produce a reinforcing lip around the aperture 22, 122 so formed enabling the powertrain catcher 30, 130 to perform its desired functionality.

With particular reference to FIGS. 11A, 11B, 11C, and 12, there is shown an alternative powertrain catcher apparatus in which the fabricated box section beam previously referred to is replaced by a single transverse structural member 215. The transverse structural member 215 can form part of a sub-frame as previously discussed or can be an independent component that is attached directly to the two side rails 12L, 12R.

In the case of this embodiment there is a weakened region 220 of the transverse structural member 215 but it is formed in a different manner to that previously described.

FIG. 11B shows on an enlarged scale the weakened region 220 which comprises primarily of a weakening slit 221 extending along the transverse structural member 215. To further weaken the transverse structural member 215 end weakening portions 223, 224 are also provided to assist a powertrain catcher 230 to punch through the transverse structural member 215. The weakening end portions 223, 224 are shown using different weakening strategies with the left hand end portion 223 using a number of spaced apart apertures arranged in a "V" shaped formation and the right hand end portion 224 using a pair of continuous slits or grooves arranged in a "V" shaped formation. These are merely examples and many other combinations are possible for producing the weakening end portions 223, 224.

As before, when a punch portion 232 of a powertrain catcher 230 impacts the weakened region 220 of the transverse structural member 215, the material of the transverse structural member 215 is deformed and the punch portion punches through the weakened region 220 to form an aperture 222 (shown in dotted outline on FIG. 11C) with which the punch portion 232 remains tightly engaged to restrain subsequent vertical and transverse movement of the powertrain 19. In one example, vertical and transverse movement may occur in radial directions of the aperture 222. As such, the aperture 222 may be configured to block radial movement of the punch portion 232.

Therefore in summary, a powertrain is prevented from moving excessively rearwardly by incorporating an arresting 'powertrain catcher' that punches an aperture in a weakened region of a structural member.

The powertrain catcher remains tightly engaged with the aperture that it has produced thereby restraining further movement of the powertrain.

The interaction between the powertrain catcher and the transverse structural member also has the effect of holding back the powertrain from a bulkhead such as a dash panel.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a powertrain catcher may comprise a feature (e.g., the punch portion) configured to degrade a portion of a transverse structural member. The feature may engage with an opening formed in the transverse structural member such that movement of the powertrain catcher, and therefore a powertrain is blocked in at least two directions. As the powertrain moves further in a rearward direction after forming the opening, a travel stop may engage with the powertrain catcher and block it from moving further in the rearward direction. The technical effect of shaping a portion of the transverse structural member to purposefully degrade during a front vehicle collision in response to contact from the feature of the powertrain catcher is to control a movement of the powertrain via the hole created in the transverse structural member, wherein the hole limits radial movement of the powertrain catcher.

As one embodiment, a vehicle comprises a powertrain, a bulkhead dividing a front compartment of the vehicle in which the powertrain is mounted from a passenger compartment of the vehicle and a powertrain catcher apparatus comprising a powertrain catcher, and a transverse structural member positioned rearwardly relative to the powertrain catcher, wherein the powertrain catcher is disposed between the powertrain and the transverse structural member and comprises a rigid arm portion extending away from a structural part of the powertrain and a punch portion extending rearwardly away from the rigid arm portion towards the transverse structural member, wherein the punch portion comprises an impact surface configured to impact and form an aperture in a region of the transverse structural member during some vehicle operating conditions, wherein the punch portion is tightly engaged with the aperture in the region.

A first example of the vehicle further comprises where the transverse structural member is located on the vehicle between the powertrain catcher and the bulkhead dividing the front compartment from the passenger compartment.

A second example of the vehicle, optionally comprising the first example, further comprises where the vehicle comprises first and second longitudinal side rails that extend from the bulkhead toward the powertrain, wherein the transverse structural member is fastened at a first end to the left side rail and is fastened at a second end, opposite the first end, to the right side rail.

A third example of the vehicle, optionally including one or more of the previous examples, further comprises where the transverse structural member is a rear cross member of a sub-frame configured to support the powertrain in the front compartment.

A fourth example of the vehicle, optionally including one or more of the previous examples, further comprises where the sub-frame also has a left side member, a right side member and a front cross member, wherein the rear cross member is fastened to the first and second longitudinal side rails via the left hand and right side members, respectively.

A fifth example of the vehicle, optionally including one or more of the previous examples, further comprises where the powertrain catcher is integrally formed with the structural part of the powertrain.

A sixth example of the vehicle, optionally including one or more of the previous examples, further comprises where the powertrain catcher is a separate component from the structural part of the powertrain, wherein the powertrain catcher is physically coupled to the structural part.

A seventh example of the vehicle, optionally including one or more of the previous examples, further comprises where the powertrain catcher apparatus further comprises a travel stop to limit rearward movement of the powertrain after engagement of the punch member with the aperture.

An eighth example of the vehicle, optionally including one or more of the previous examples, further comprises where the travel stop is formed integrally with the powertrain catcher.

A ninth example of the vehicle, optionally including one or more of the previous examples, further comprises where the travel stop is formed as part of the transverse structural member.

A tenth example of the vehicle, optionally including one or more of the previous examples, further comprises where the transverse structural member is a box section beam comprising upper and lower members having overlapping edge portions that are physically coupled together to form the box section beam.

An eleventh example of the vehicle, optionally including one or more of the previous examples, further comprises where at least one edge of the upper and lower members are combined to shape a front face of the box section beam, wherein the upper and lower members comprise a recess to form a cutaway forming the region, wherein a durability of the region is less than a durability of a remaining portion of the upper and lower members.

A twelfth example of the vehicle, optionally including one or more of the previous examples, further comprises where the upper and lower members do not overlap at the region.

A thirteenth example of the vehicle, optionally including one or more of the previous examples, further comprises where the upper and lower members are not physically coupled at the region.

An embodiment of a system comprises a powertrain, a bulkhead arranged between the powertrain and an interior cabin, a powertrain catcher integrally formed with the powertrain, the powertrain catcher comprising a punch portion extending perpendicularly to a body of the powertrain catcher in a rearward direction toward the bulkhead, and a transverse member comprising a forward facing surface that is less durable than other surfaces of the transverse member, wherein the punch portion is configured to puncture the forward facing surface and generate a hole shaped to block radial motion of the powertrain catcher.

A first example of the system further comprises where the punch portion further comprises a travel stop arranged along a circumference of the punch portion, wherein the travel stop comprises a diameter greater than a diameter of the hole.

A second example of the system, optionally including the first example, further comprises where the punch portion is configured to puncture the forward facing surface and generated the hole in response to a frontal vehicle collision, and wherein the punch portion is spaced away from the forward facing surface outside of the frontal vehicle collision.

A third example of the system, optionally including one or more of the previous examples, further includes where a travel stop is arranged between the forward facing surface and the bulkhead, and wherein the travel stop is configured to block rearward motion of the powertrain catcher.

A fourth example of the system, optionally including one or more of the previous examples, further includes where the forward facing surface comprises one or more cutouts configured to allow the punch portion to press therethrough.

An embodiment of a hybrid vehicle comprises an engine coupled to an electric machine with a metal adaptor ring and a powertrain catcher integrally formed on the metal adaptor ring, the powertrain catcher arranged between a powertrain and a rear cross member of a sub-frame used to support the powertrain in a front compartment of the hybrid vehicle, wherein the rear cross member comprises a forward facing surface with one or more cutouts configured to reduce a durability of the forward facing surface, and wherein the powertrain catcher comprises a punch portion configured to form a hole in the forward facing surface in response to the powertrain being displaced in a rearward direction toward rear cross member, wherein the punch portion further comprises a travel stop shaped as a single piece extending around a circumference of the punch portion, wherein a diameter of the travel stop is greater than a diameter of the hole.

In another representation, the vehicle is a hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle, comprising:
a powertrain;
a bulkhead dividing a front compartment of the vehicle in which the powertrain is mounted from a passenger compartment of the vehicle and a powertrain catcher apparatus comprising a powertrain catcher; and
a transverse structural member positioned rearwardly relative to the powertrain catcher, wherein the powertrain catcher is disposed between the powertrain and the transverse structural member and comprises a rigid arm portion extending away from a structural part of the powertrain and a punch portion extending rearwardly away from the rigid arm portion towards the transverse structural member, wherein the punch portion comprises an impact surface configured to impact and form an aperture in a region of the transverse structural member during some vehicle operating conditions, wherein the punch portion is tightly engaged with the aperture in the region.

2. The vehicle of claim 1, wherein the transverse structural member is located on the vehicle between the powertrain catcher and the bulkhead dividing the front compartment from the passenger compartment.

3. The vehicle of claim 1, wherein the vehicle comprises first and second longitudinal side rails that extend from the bulkhead toward the powertrain, wherein the transverse structural member is fastened at a first end to the left side rail and is fastened at a second end, opposite the first end, to the right side rail.

4. The vehicle of claim 3, wherein the transverse structural member is a rear cross member of a sub-frame configured to support the powertrain in the front compartment.

5. The vehicle of claim 4, wherein the sub-frame also has a left side member, a right side member and a front cross member, wherein the rear cross member is fastened to the first and second longitudinal side rails via the left hand and right side members, respectively.

6. The vehicle of claim 1, wherein the powertrain catcher is integrally formed with the structural part of the powertrain.

7. The vehicle of claim 1, wherein the powertrain catcher is a separate component from the structural part of the powertrain, wherein the powertrain catcher is physically coupled to the structural part.

8. The vehicle of claim 1, wherein the powertrain catcher apparatus further comprises a travel stop to limit rearward movement of the powertrain after engagement of the punch member with the aperture.

9. The vehicle of claim 8, wherein the travel stop is formed integrally with the powertrain catcher.

10. The vehicle of claim 8, wherein the travel stop is formed as part of the transverse structural member.

11. The vehicle of claim 1, wherein the transverse structural member is a box section beam comprising upper and lower members having overlapping edge portions that are physically coupled together to form the box section beam.

12. The vehicle of claim 11, wherein at least one edge of each of the upper and lower members are combined to shape a front face of the box section beam, wherein the upper and lower members comprise a recess to form a cutaway forming the region, wherein a durability of the region is less than a durability of a remaining portion of the upper and lower members.

13. The vehicle of claim 12, wherein the upper and lower members do not overlap at the region.

14. The vehicle of claim 12, wherein the upper and lower members are not physically coupled at the region.

15. A system, comprising:
a powertrain;
a bulkhead arranged between the powertrain and an interior cabin;
a powertrain catcher integrally formed with the powertrain, the powertrain catcher comprising a punch portion extending perpendicularly to a body of the powertrain catcher in a rearward direction toward the bulkhead; and
a transverse member comprising a forward facing surface that is less durable than other surfaces of the transverse member, wherein the punch portion is configured to puncture the forward facing surface and generate a hole shaped to block radial motion of the powertrain catcher.

16. The system of claim 15, wherein the punch portion further comprises a travel stop arranged along a circumference of the punch portion, wherein the travel stop comprises a diameter greater than a diameter of the hole.

17. The system of claim 15, wherein the punch portion is configured to puncture the forward facing surface and generated the hole in response to a frontal vehicle collision, and wherein the punch portion is spaced away from the forward facing surface outside of the frontal vehicle collision.

18. The system of claim 15, wherein a travel stop is arranged between the forward facing surface and the bulkhead, and wherein the travel stop is configured to block rearward motion of the powertrain catcher.

19. The system of claim 15, wherein the forward facing surface comprises one or more cutouts configured to allow the punch portion to press therethrough.

20. A hybrid vehicle, comprising:
an engine coupled to an electric machine with a metal adaptor ring; and
a powertrain catcher integrally formed on the metal adaptor ring, the powertrain catcher arranged between a powertrain and a rear cross member of a sub-frame used to support the powertrain in a front compartment of the hybrid vehicle; wherein
the rear cross member comprises a forward facing surface with one or more cutouts configured to reduce a durability of the forward facing surface, and wherein the powertrain catcher comprises a punch portion configured to form a hole in the forward facing surface in response to the powertrain being displaced in a rearward direction toward rear cross member, wherein the punch portion further comprises a travel stop shaped as a single piece extending around a circumference of the punch portion, wherein a diameter of the travel stop is greater than a diameter of the hole.

* * * * *